(12) United States Patent
Mayne

(10) Patent No.: US 7,137,357 B2
(45) Date of Patent: Nov. 21, 2006

(54) PORTABLE EXERCISING SYSTEM FOR ANIMALS

(76) Inventor: Paul Mayne, 3 Taintor Way, Millbrook, NY (US) 12545

( * ) Notice: Subject to any disclaimer, the term of this patent is extended or adjusted under 35 U.S.C. 154(b) by 8 days.

(21) Appl. No.: 11/002,641

(22) Filed: Dec. 1, 2004

(65) Prior Publication Data
US 2006/0112900 A1 Jun. 1, 2006

(51) Int. Cl.
*A01K 15/02* (2006.01)
(52) U.S. Cl. ................................ 119/704; 119/703
(58) Field of Classification Search ............... 119/712, 119/704, 512, 513, 514
See application file for complete search history.

(56) References Cited

U.S. PATENT DOCUMENTS

| | | | |
|---|---|---|---|
| 317,865 A | | 5/1885 | Shedd |
| 2,581,318 A | | 1/1952 | Bartlett ........................ 119/20 |
| 2,610,830 A | * | 9/1952 | Beatty ........................ 119/513 |
| D229,570 S | * | 12/1973 | Johnson ...................... 119/704 |
| 3,921,585 A | * | 11/1975 | Hall ............................ 119/512 |
| 4,250,836 A | * | 2/1981 | Smith .......................... 119/512 |
| 4,275,686 A | * | 6/1981 | MacGillivray .............. 119/701 |
| 5,630,380 A | | 5/1997 | Karanges .................... 119/704 |
| 6,213,056 B1 | | 4/2001 | Bergmann et al. .......... 119/704 |
| 6,694,919 B1 | * | 2/2004 | Haring ........................ 119/704 |

FOREIGN PATENT DOCUMENTS

GB 2249012 A * 4/1992

OTHER PUBLICATIONS

Brochure—The Elite Exer-ciser by Elite Equestrian Products, Inc. pp. 1-3).

* cited by examiner

*Primary Examiner*—Teri Pham Luu
*Assistant Examiner*—Elizabeth Shaw
(74) *Attorney, Agent, or Firm*—Winston & Strawn LLP

(57) ABSTRACT

A portable animal exercising device that includes a plurality of individual panel members engageable in a manner sufficient for assembling inner and outer boundaries that define a width therebetween to create a circular exercise path for the animal. At least one animal-prodding curtain is configured and dimensioned for sufficiently spanning the width of the path so that the animal cannot pass between the curtain and the inner and outer boundaries. A central, rotatable drive member is provided for advancing the curtain along the path at a selectable, predetermined speed corresponding to the desired movement of the animal along the path, with the drive member being mounted upon a support that is portable for removably positioning the drive member at a desired location. Also, a radially extending arm is releasably connected between the drive member and curtain. The components of the device are designed to be assembled to form the animal exercising device in one location but can be disassembled and arranged in a compact form for transport to a different location.

19 Claims, 3 Drawing Sheets

PORTABLE EXERCISING SYSTEM FOR ANIMALS

BACKGROUND

The invention relates to a portable exercising system for animals such as horses. The system is transportable to a desired location where it can be set up quickly for use on a temporary or periodic basis. Thereafter, the system can be dismantled and stored on a support, such as a trailer, for transport to a different location for use at that location.

A number of exercising devices are available for animals such as horses. Older devices, such as that disclosed in Shedd U.S. Pat. No. 317,865, included rotatable arms to which the horse or horses can be tethered and worked. This device is designed and intended to safely work wild horses, but is deficient and dangerous to the horses since they are tethered to a bridle or their necks and can risk injury when attempting to pull lose from the tether. More recent patents, such as Bergmann et al. U.S. Pat. No. 6,213,056 and Karanges U.S. Pat. No. 5,630,380, disclose concentrically arranged, permanently installed fences which define a circular pathway therebetween. In the center of the circles, a vertical, rotatable shaft is mounted. The shaft supports a plurality of horizontal arms, typically four, each of which terminate in a hanging grid or gate that is supplied with an electrical charge. As the arms rotate, the grids move circumferentially along the path. Horses can be placed on the path between the grids and are urged to exercise such as to walk by the movement of the gates, since if the horses stop, they are contacted by the gates and receive an electrical shock that urges them to move. A similar device known as the Exer-Ciser is commercially available from Elite Equestrian Products, Sulphur, Ky.

While these devices are somewhat useful, they require a permanent installation of the fencing that defines the path. This requires greater expense for installation, and requires sufficient open area in order to facilitate the installation and maintenance of such permanent installation. There are many situations where exercising space for animals is at a premium, or where temporary exercising installations are required. Thus, the present invention now satisfies these needs by providing a device that improves upon the shortcomings of the prior art.

SUMMARY OF THE INVENTION

The invention relates to a portable animal exercising device, which comprises a plurality of individual panel members engageable in a manner sufficient for assembling inner and outer boundaries that define a width therebetween to create a circular exercise path for the animal; at least one animal-prodding curtain that is configured and dimensioned for sufficiently spanning the width of the path so that the animal cannot pass between the curtain and the inner and outer boundaries; a central, rotatable drive member for advancing the curtain along the path at a selectable, predetermined speed corresponding to the desired movement of the animal along the path, with the drive member being mounted upon a support that is portable for removably positioning the drive member at a desired location; and a radially extending arm releasably connected between the drive member and curtain. The components of the device are designed to be assembled to form the animal exercising device at one location but can be disassembled and arranged in a compact form for transport to a different location.

Advantageously, the arm is configured and dimensioned with telescoping portions to facilitate assembly and a joining member is provided between the curtain and drive member for holding the telescoping portions together. The arm preferably includes three telescopic portions and the joining member comprises a chain or wire.

In a preferred embodiment, a source of energy is operatively associated with the curtain for encouraging the animal to move when the animal contacts the curtain. This source of energy generally provides electrical energy and the curtain is in electrical association with the energy source, with the curtain comprising a top rail and a plurality of vertical slat members removably connected to the rail. The curtain preferably includes at least one horizontal cross member for minimizing horizontal movement of the slat members. When only some of the slat members are secured to the cross member, the unsecured slat members rattle as the curtain is moved to warn the animal of the approaching curtain. The device generally includes between 2 and 8 curtains to divide the path into between 2 and 8 segments with each segment accommodating one animal.

The panel members typically comprise a frame that removably supports a solid, lightweight panel and connecting elements that facilitate joining or connection of adjacent panel members to form closed inner and outer boundaries that define a continuous, closed circular exercise path. The connecting members include at least two male pin components mounted on one side of a panel member and at least two female pin-receiving components mounted on an opposite side of the panel member. Preferably, the panel members have essentially the same height with a majority of the panel members used to form the inner boundary having a first width and a majority of the panel members used to form the outer boundary having a second width, with the second width being greater than the first width. Preferably, each panel member includes a frame and a panel wherein the panel is made of wood, plastic or fabric or sheet metal and is removably attached to the frame by fasteners.

In the device, a controller for the rotatable drive member may be provided for selectively moving the curtain(s) in a clockwise or counterclockwise direction. Also, the support for the rotatable drive member may comprise a flat bed trailer which also holds all components for transport from one location to another.

The invention also relates to a method of exercising animals at a selectable location, such as at a sporting event, which comprises delivering the portable animal exercising device of the invention to the location, erecting or assembling the device at the location, periodically exercising animals at the location to help maintain their fitness, and disassembling the device after the animals exercise. The device and method are preferably used to exercise horses at sporting events.

BRIEF DESCRIPTION OF THE DRAWINGS

The features and advantages of the present invention are more fully realized upon a review of the following detailed description and the appended drawing figures, wherein.

DETAILED DESCRIPTION OF THE PREFERRED EMBODIMENTS

As noted, the present invention relates to a portable exercising device for animals such as horses. The components of the device fit on a relatively small trailer that can be attached to a truck and transported to a desired location where the exercising apparatus is needed. The trailer also includes supports a rotatable post and drive system that moves the curtains around the circular path that is defined between the inner and outer boundaries that are constructed from the panel members.

The device can be erected in any location, on dirt, grass, gravel or even asphalt or concrete. Erection on a dirt or grass area is preferred as it provides a softer surface upon which the horse can exercise. It is also possible, but not critical, for the circular travel path to be provided with a layer of soft earth or sand to smooth out irregularities and provide a softer surface for the horses. Also, covering grass by providing a layer of earth or sand discourages the horses from trying to graze on the grass rather than exercise.

Figure 1:
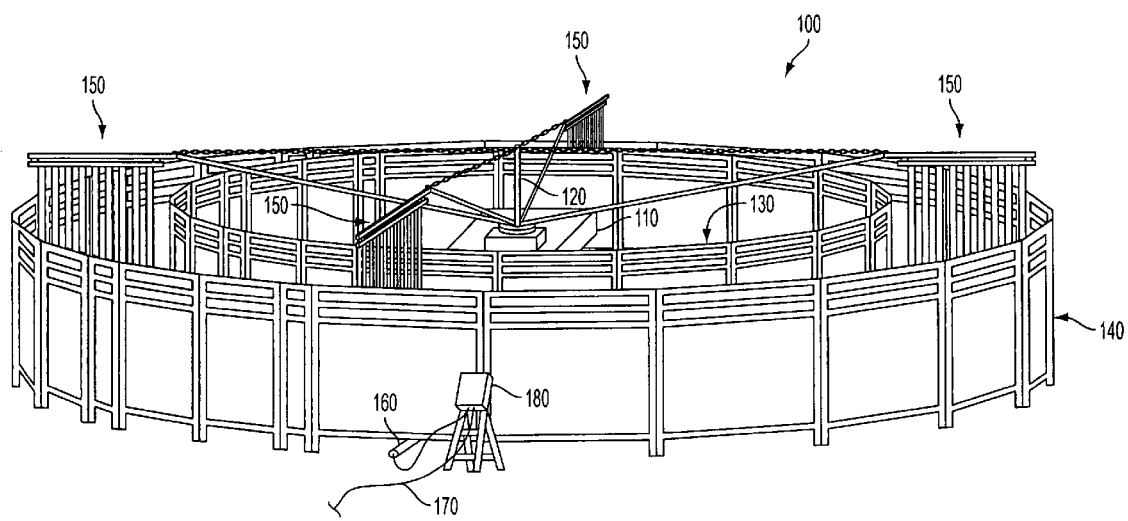
FIG. 1 is a perspective view of the overall device erected and installed at a desired location.

FIG. 1 illustrates the entire exercising device 100 after assembly. The flat bed trailer 110 with rotatable post 120 and drive system is positioned in the center of the inner boundary 130 and is surrounded by that boundary. This center area provides more than enough room to accommodate and retain the trailer therein. In addition to providing the inner circumference of the path, the inner boundary 130 prevents the horses from entering into the area where the trailer 110, rotatable post and drive system are located. The inner boundary 130 is assembled with at least one panel member that can be easily opened and closed to access to the trailer. Also, the outer boundary 140 is assembled with at least one panel member that can be easily opened and closed to allow horses to enter and exit the path.

As shown, there are four curtains 150 that can be moved along the path so that four horses can be exercised simultaneously. For simplicity, only one of the curtain assemblies will be described in detail below with it being understood that the other curtain assemblies are essentially the same. As noted, between 2 and 8 curtains can be configured for each portable exercise device as desired by the user, the overall diameter of the device and the number of horses that need to be exercised simultaneously. Preferably, between 4 and 6 curtains are used to maintain a reasonably compact size of the device.

As noted, the rotatable post is located in the center of the ring, mounted on a support. Conveniently, the support is associated with or forms part of the trailer bed so that the device can be moved to a desired location for assembly and use prior to transport to a different location for future assembly and use. The drive system for the post is conventional and is known from the Exer-Ciser device that is available from Elite Equestrian Products of Lexington, Ky. as well as the devices disclosed in the cited Bergmann et al. and Karanges patents. Of course, the present device differs from the conventional arrangement due to its mounting upon a movable support such as the trailer bed rather than being constructed as a permanent installation.

The drive system requires electrical power to be operational. It is possible to provide a gas-powered generator near the rotator, but this generates noise that may be disturbing or distracting to the horses while also adding cost to the system. Accordingly, it is preferred for the drive system for rotating post to be powered from a source of electricity at the location where the device is to be erected.

Provision should be made for routing power cables 170 from an electrical power source to the drive system that rotates the rotatable post. The easiest way to do this is to route the power cables through a plastic tube or conduit 160 that extends from the source and across the path to the drive system. The tube may be made of a plastic material such as polyethylene or PVC as these materials can withstand damage when being stepped upon by the horses. For greatest protection of the power cables, the tube can be placed in a shallow trench and covered it with earth, sand or gravel so that it is not directly trod upon by the horses as they are exercising.

The power source also needs to provide energy or power to the controller 180. The controller can be operatively associated with the drive system by wiring or wirelessly. Such controllers are conventional and are known to skilled artisans, and can be implemented to move the curtains at various speeds so that the horse can walk, cantor or even gallop around the path. The controller can also reverse the direction of curtain travel so that the horse can periodically move in an opposite direction. The controller 180 can be operated manually or can be programmed for a predetermined exercise regimen, as desired. A typical manual controller is known and is available from Elite Equestrian Products as part of their Exer-Ciser device.

Figure 2:
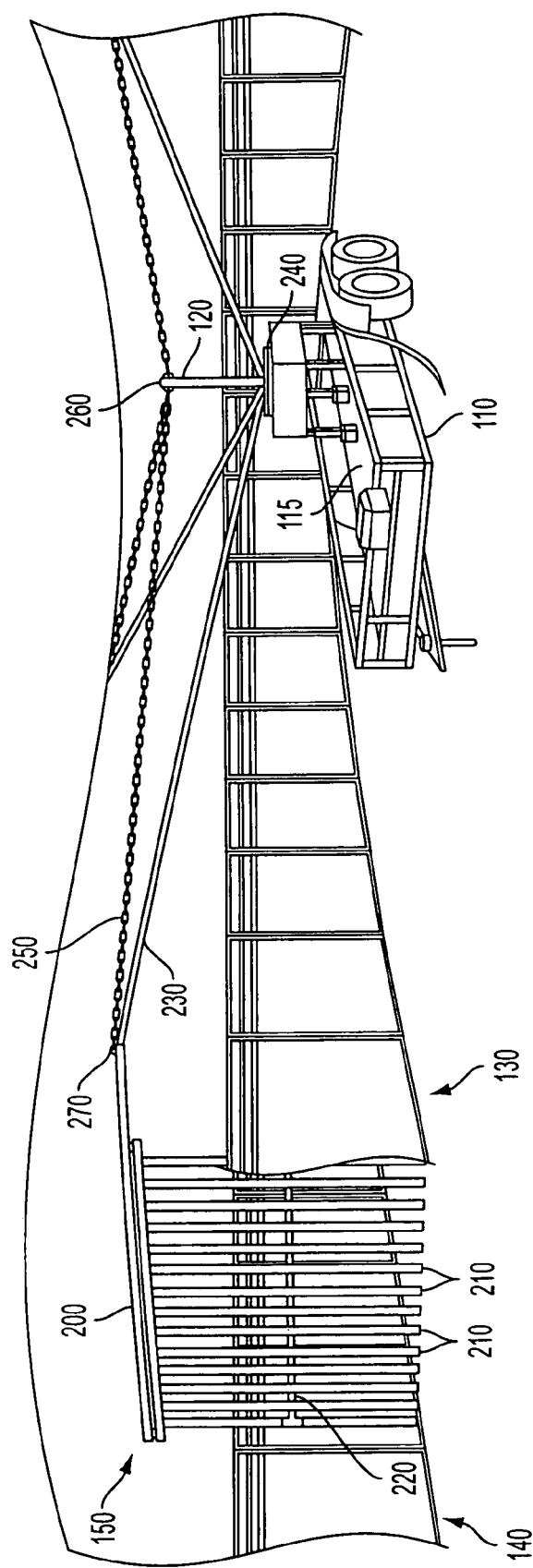
FIG. 2 is a view of the device of FIG. 1 in a partially assembled condition to more fully illustrate the moving curtain and to illustrate the trailer that is used to carry the components of the device with the trailer shown in an operable position ready for use.

FIG. 2 illustrate the details of the curtain and its connection to the rotatable post via the telescopic boom segments. The curtain assembly 150 includes a horizontal top bar 200 that supports a number of vertical slat members 210 that hang from the top bar. These slats can be mechanically connected to the bar or can be formed integrally by welding or brazing them to the top bar. The slats include at least one horizontal member 220 that helps maintain the slats in vertical association. Preferably, the slats and top bar are made of metal and are energized, such as by a 12 volt battery or energy source, so that the horse receives a shock when contacted by the slats. The number of slats is not critical, but there must be a sufficient number of them so that the curtain substantially spans the width of the path. This arrangement assures that the horse cannot avoid the curtain by staying close to the inner or outer boundaries as the curtain goes by. In addition, the vertical slats 210 must have a length sufficient to come relatively close to the ground so that the horse cannot bend over or lie down to avoid contact with the curtain. This configuration assures that the horse cannot remain stationary and avoid the curtain as it moves along the path.

The curtain 150 is also effective in teaching the horse that it must keep moving during the exercise period. During the first uses of the device with a particular horse, if the horse stops when it should otherwise be moving, it will be contacted by the curtain and will receive a slight current jolt or electric shock to encourage movement. For this purpose, the curtain is made of conductive materials, such as metals, to properly carry the charge and to transfer it to the horse. While it is possible to permanently connect all slats to the horizontal bars, it is preferred to leave almost all of them loose, as this enables the curtain to make a rattling noise as it moves along the path. Preferably, only the outermost slats are permanently affixed to the horizontal bar 220. The horses soon learn what happens when they are contacted by the curtain, and they learn to move to avoid it when hearing the rattling sound approaching rather than waiting for the device to contact and shock them.

The curtain is mounted at the end of a telescopic boom 230 which is attached to the rotatable post. Preferably, the rotatable post is attached to a stabilizer plate 240 that is also rotatable, an the boom 120 is mounted upon the rotatable stabilizer plate 240. To assist in holding the boom segments together and supporting the weight of the boom and curtain, a tensioning member, such as a wire or chain 250, is connected to the top bar of the curtain and extends to the rotatable post 120. The wire or chain 250 can be connected to an eyebolt 260, 270 or other suitable connector that facilitates releasable attachment and detachment to the boom 230 and top rail 200 of the curtain to enable the boom and curtain to be installed or disassembled as necessary. Of course, skilled artisans can configure alternative attachments or supports so that the curtain is properly suspended in the path and can be moved at various speeds as desired.

As noted above, the rotation of the post is controlled by the controller and drive member. Preferably, the controller is mounted outside of the outer boundary so that the speed and direction of the moving curtain can be controlled remotely.

The panel members are preferably constructed to be modular in nature. Generally, each one has essentially the same height and is sufficiently tall to retain the horses therein. In this way, the horse cannot jump over the panel members in an attempt to escape from the path. A typical height for these panel members is around 5 to 6 feet.

To create the inner barrier, a plurality of panel members of essentially the same width are provided. For a diameter of 17' for the inner boundary, twenty-six (26) 4' wide panels can be used, along with four 2' panels. While two 4' panels can be used for two 2' panels, the use of the two smaller panels facilitates the closure of the barrier and also provides a smaller portion that can be used for access to the rotatable post and trailer.

Similarly, for the outer boundary, a diameter of 25' provides with the inner boundary a circular path that is about 8' wide. Twenty-six (26) 6' panels can be used, along with two 2' panels and two 4' panels to complete the circumference of the outer boundary. While two 6' panels can be used instead of the 2' and 4' panels, the use of the smaller panels facilitates the closure of the barrier, and also provides a smaller portion that can be used for access to the path or to allow entry and exit of the horses into and out of the path.

Figure 3:
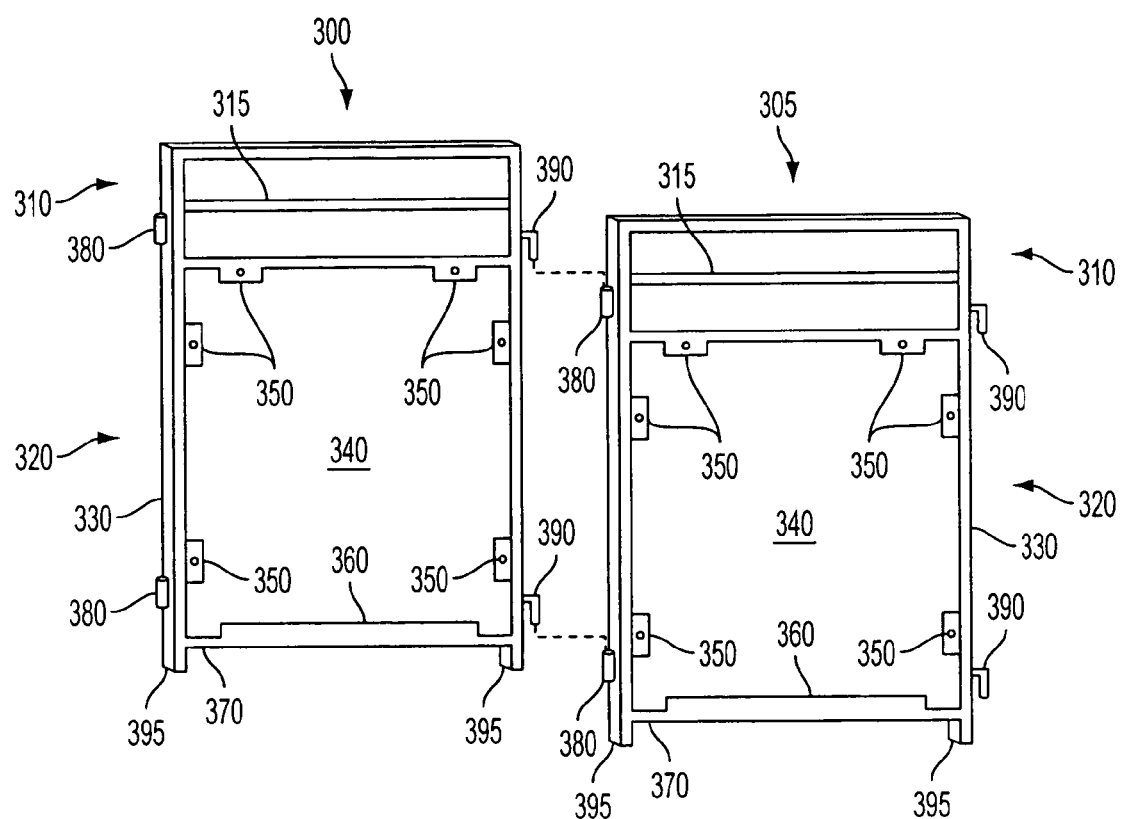
FIG. 3 is a front view of one of the panel members that are used to form the inner or outer barriers.

FIG. 3 illustrates a pair of preferred panel members 300, 305 for use in the present invention. Each panel member includes a generally rectangular frame that include an upper section 310 and a lower section 320. The upper section 310 is generally open so that the head of the horse is visible as it moves along the path. For stiffening of the upper section without adding too much weight, a horizontal cross-bar 315 is provided. Of course, vertical or other stiffening members or combinations thereof can be used provided that the upper section 310 remains sufficiently open to view the horse's head during movement around the path.

The lower section 320 also includes a generally rectangular frame into which is mounted a generally rectangular panel 330. The frames can typically be made of a lightweight metal such as aluminum although high strength steel is also acceptable. The panels 340 can be made of any one of a variety of materials, including wood, plastic or sheet metal or even a fabric, preferably one that is of high strength and made of a synthetic material. The panels are designed to be relatively smooth to present a solid looking barrier to prevent the horse from attempting to escape from the path. In addition, the panels are releasably connected to the frame for a number of reasons. If the panel is kicked by a horse at an angle of less than 90 degrees, its smooth surface will deflect the blow. Even if a perpendicular kick occurs, the panel is likely to be dislodged from one or two of the mounting means, rather than breaking or fracturing in a way that can injure the horse. This is a significant advantage over a metal screen or grid which when kicked by the horse can be pierced or broken with ensuing injury to the horse's leg. Furthermore, the releasable connection of the panel member to the frame allows easy replacement of the panel if it is damaged or deteriorates due to use, transport, rough handling or exposure to weather.

The panels can be releasably secured to the frame by a variety of methods. They can be provided with holes and tied to the frame by rope or wire. For a more secure arrangement, however, the frame can be provided with brackets 350 and the panels attached to the brackets using suitable hardware, i.e., bolts and nuts. A most preferred arrangement includes a U-shaped channel 360 that is welded or otherwise provided on the lower rail 370 of the frame and upon which the panel member 340 is received. Then, along the sides and upper rail of the frame, a number of L-shaped brackets 350 are provided, with alignment holes provided in the brackets and panel so that the panel can be bolted to the brackets. The number of brackets is not critical and can vary based on the size of the panels and height of the panel member. The skilled artisan can select an appropriate number and placement of brackets depending upon the specific panel material and rigidity desired. Instead of brackets channels or other releasable securing means can be used. Other arrangements can be used to place the panel on the frame, such as configuring the side rails with vertical grooves and sliding the panels into the grooves with the weight of the panels holding them in position in contact with the lower rail 370. Skilled artisans can also devise other suitable arrangements.

Preferred panel thicknesses and materials include ¼" to ½" plywood or plastic sheets. Polyethylene is suitable as a plastic material, as are engineering plastics although those are generally more expensive than polyethylene. When made of plastic, the panels can be provided as colored, clear or translucent sheets, although opaque panels are preferred to encourage the horses from remaining on the path. Advertising or other information can be printed or otherwise applied to the panels on the outside of the outer barrier, if desired.

Each panel member preferably includes connecting elements for rapidly assembling and disassembling the inner and outer barriers. One convenient way to do this is to form at least two hollow receptacles or short tubes 380 on one side of the frame of the panel members and two corresponding bent rods or pins 390 on the opposite side of the frame of the panel members. Thus, a first panel member is initially placed on the ground at a predetermined radial distance away from the rotatable member and then adjacent panel members are sequentially connected by placing its rods or pins into the hollow receptacles of the previous panel member. The rods should have a length that is sufficiently long to remain in the hollow receptacles and to prevent disengagement when the panel members are pushed or bumped by the horses. The connections do not have to be fully resistant to all forces or be permanent since the horses learn to believe that the barriers are solid and generally do not try to force their way past them, but these connections do have to be sufficiently secure to hold the barrier members in position to define the circular exercise path.

As the panel members are temporarily installed, care is taken so that the panel members do not sink into the earth or ground. Generally, the feet 395 of the panel members can be open square or round tubes, but it is preferred that the tube ends be closed or provided with a flat plate so that the panel members do not sink into the earth. The flat plates mounted on the ends of the tubes are preferred when the panel members are to be assembled onto a relatively flat surface, such as grass, dirt, asphalt, concrete, wood or a synthetic turf.

Returning now to FIG. 2, when the system is to be transported to another location, the panel members of the inner and outer boundaries are separated and stacked upon each other on the trailer. Also, the curtains and telescopic boom segments are also disassembled and placed upon the flat bed portion 115 of the trailer 110. Suitable tie down means, such as rope, clamps, belts or the like, can be used to hold the panel members, curtains and boom segments on the trailer to prevent loss of the components as the trailer is towed by a truck or other suitable vehicle at high speed on highways. Once the trailer arrives at the next location where the system is to be installed, the components are simply removed from the trailer and are assembled to construct the portable exercising system. This enables the system to be transported to different locations for local exercise of the animals at that location. For example, the device can be delivered to a horse show or jumping event where the horses participating in the event can exercise between competition to maintain their fitness and conditioning. After the event is complete, the device can be disassembled and stored on the trailer for transport to another event in a different location, for example, to another show or competition. As the horses that participate in such events need to exercise to keep in shape, this system is essential in contributing to their conditioning and training, and its portability allows it to be dispatched to the particular venues where the events are being held for assembly and erection at those venues.

What is claimed is:

1. A portable animal exercising device which comprises the following components:
   a plurality of individual panel members engageable in a manner sufficient for assembling inner and outer boundaries that define a width therebetween to create a circular exercise path for the animal;
   at least one animal-prodding curtain that is configured and dimensioned for sufficiently spanning the width of the path so that the animal cannot pass between the curtain and the inner and outer boundaries;
   a central, rotatable drive member for advancing the curtain along the path at a selectable, predetermined speed corresponding to the desired movement of the animal along the path, with the drive member being mounted upon a support that is portable for removably positioning the drive member at a desired location; and
   a radially extending arm releasably connected between the drive member and curtain;
   wherein the components can be assembled to form an animal exercising device in one location but can be disassembled and arranged in a compact form for transport to a different location, and wherein the arm is configured and dimensioned with telescoping portions to facilitate assembly and the device includes a joining member between the curtain and drive member for holding the telescoping portions together.

2. The device of claim 1, wherein the ann includes three telescopic portions and the joining member comprises a chain or wire.

3. A portable animal exercising device which comprises the following components:
   a plurality of individual panel members engageable in a manner sufficient for assembling inner and outer boundaries that define a width therebetween to create a circular exercise path for the animal;
   at least one animal-prodding curtain comprising a top rail, a plurality of vertical slat members removably connected to the rail and at least one horizontal cross member for minimizing horizontal movement of the slat members, the curtain being configured and dimensioned for sufficiently spanning the width of the path so that the animal cannot pass between the curtain and the inner and outer boundaries, wherein only some of the slat members are secured to the cross member so that unsecured slat members rattle as the curtain is moved to warn the animal of the approaching curtain;
   a source of energy in electrical association with the curtain for providing electrical energy to the curtain for encouraging the animal to move when the animal contacts the curtain;
   a central, rotatable drive member for advancing the curtain along the path at a selectable, predetermined speed corresponding to the desired movement of the animal along the path, with the drive member being mounted upon a support that is portable for removably positioning the drive member at a desired location; and
   a radially extending ann releasably connected between the drive member and curtain.

4. The device of claim 3, wherein between 2 and 8 curtains are provided to divide the path into between 2 and 8 segments with each segment accommodating one animal.

5. The device of claim 3, wherein the panel members comprise a frame that removably supports a solid, lightweight panel and connecting elements that facilitate joining or connection of adjacent panel members to form closed inner and outer boundaries that define a continuous, closed exercise path.

6. The device of claim 5, wherein the connecting members include at least two male pin components mounted on one side of a panel member and at least two female pin-receiving components mounted on an opposite side of the panel member.

7. The device of claim 5, wherein the panel members have essentially the same height with a majority of the panel members used to form the inner boundary having a first width and a majority of the panel members used to form the outer boundary having a second width, with the second width being grater than the first width.

8. The device of claim 7, wherein each panel member includes a frame and a panel wherein the panel is made of wood, plastic or fabric or sheet metal and is removably attached to the frame by fasteners.

9. The device of claim 3, which further comprises a controller for the rotatable drive member for selectively moving the curtain(s) in a clockwise or counterclockwise direction.

10. A portable animal exercising device which comprises the following components:
   a plurality of individual panel members engageable in a manner sufficient for assembling inner and outer boundaries that define a width therebetween to create a circular exercise path for the animal;
   at least one animal-prodding curtain that is configured and dimensioned for sufficiently spanning the width of the path so that the animal cannot pass between the curtain and the inner and outer boundaries;
   a central, rotatable drive member for advancing the curtain along the path at a selectable, predetermined speed corresponding to the desired movement of the animal along the path, with the drive member being mounted upon a support that is portable for removably positioning the drive member at a desired location; and a radially extending arm releasably connected between the drive member and curtain;

wherein the components can be assembled to form an animal exercising device in one location but can be disassembled and arranged in a compact form for transport to a different location, wherein the support for the rotatable drive member comprises a flat bed trailer which holds all components for transport from one location to another.

11. The device of claim 10, wherein between 2 and 8 curtains are provided to divide the pat into between 2 and 8 segments with each segment accommodating one animal.

12. The device of claim 10, wherein the panel members comprise a frame that removably supports a solid, lightweight panel and connecting elements that facilitate joining or connection of adjacent panel members to form closed inner and outer boundaries that define a continuous, closed exercise path.

13. The device of claim 12, wherein the connecting members include at least two male pin components mounted on one side of a panel member and at least two female pin-receiving components mounted on an opposite side of the panel member.

14. The device of claim 12, wherein the panel members have essentially the same height with a majority of the panel members used to form the inner boundary having a first width and a majority of the panel members used to form the outer boundary having a second width, with the second width being greater than the first width.

15. The device of claim 14, wherein each panel member includes a frame and a panel wherein the panel is made of wood, plastic or fabric or sheet metal and is removably attached to the frame by fasteners.

16. The device of claim 10, which further comprises a controller for the rotatable drive member for selectively moving the curtain(s) in a clockwise or counterclockwise direction.

17. The device of claim 10, which further comprises a source of electrical energy in electrical association with the curtain for encouraging the animal to move when the animal contacts the curtain.

18. A method of exercising animals at a selectable location, which comprises:

providing a portable, non-permanent animal exercising device that includes of the following components:

a flat-bed trailer;

a plurality of individual panel members engageable in a manner sufficient for assembling temporary inner and outer boundaries that define a width therebetween to create a circular exercise path for the animal upon a dirt, grass, gravel, asphalt or concrete surface, wherein the panel members comprise a frame that is erected upon the surface and that removably supports a solid, lightweight panel and connecting elements that facilitate joining or connection of adjacent panel members to form the temporary inner and outer boundaries that define a continuous, closed exercise path, wherein the connecting members comprise at least two male pin components mounted on one side of a panel member and at least two female pin-receiving components mounted on an opposite side of the panel member so that the boundaries can be easily erected for use and disassembled for transport;

at least one animal-prodding curtain that is configured and dimensioned for sufficiently spanning the width of the path so that the animal cannot pass between the curtain and the inner and outer boundaries;

a central, rotatable drive member far advancing the curtain along the path at a selectable, predetermined speed corresponding to the desired movement of the animal along the path, with the drive member being mounted upon the flat-bed trailer so that it is portable for positioning at a desired location, and a radially extending ann releasably connected between the drive member and curtain;

delivering the portable animal exercising device to the location;

erecting or assembling the device at the location;

periodically exercising animals at that location to help maintain their fitness;

disassembling the device after the animals exercise;

collecting and holding device components on the flat-bed trailer; and transporting the device components on the trailer to another location for exercising animals at that location.

19. The method of claim 18, wherein the animal is a horse and the selectable location is at a sporting event.

* * * * *

UNITED STATES PATENT AND TRADEMARK OFFICE
CERTIFICATE OF CORRECTION

PATENT NO. : 7,137,357 B2 Page 1 of 1
APPLICATION NO. : 11/002641
DATED : November 21, 2006
INVENTOR(S) : Mayne It is certified that error appears in the above-identified patent and that said Letters Patent is hereby corrected as shown below:

Column 7:
Line 61 (claim 2, line 1), delete "ann" and insert -- arm --.

Column 8:
Line 24 (claim 3, line 28), delete "ann" and insert -- arm --.
Line 45 (claim 7, line 6), delete "grater" and insert -- greater --.

Column 9:
Line 13 (claim 11, line 2), delete "pat" and insert -- path --.

Column 10:
Line 24 (claim 18, line 27), delete "far" and insert -- for --.
Line 30 (claim 18, line 33), delete "ann" and insert --arm --.

Signed and Sealed this

Sixteenth Day of January, 2007

JON W. DUDAS
*Director of the United States Patent and Trademark Office*